United States Patent
Park et al.

(10) Patent No.: US 11,847,457 B1
(45) Date of Patent: Dec. 19, 2023

(54) SYSTEM FOR ERROR DETECTION AND CORRECTION IN A MULTI-THREAD PROCESSOR

(71) Applicant: Ceremorphic, Inc., San Jose, CA (US)

(72) Inventors: Heonchul Park, Pleasanton, CA (US); Sri Hari Nemani, Vijayawada (IN); Patel Urvishkumar Jayrambhai, Matpur (IN); Dhruv Maheshkumar Patel, Visnagar (IN)

(73) Assignee: Ceremorphic, Inc., San Jose, CA (US)

( * ) Notice: Subject to any disclaimer, the term of this patent is extended or adjusted under 35 U.S.C. 154(b) by 0 days.

(21) Appl. No.: 17/829,050

(22) Filed: May 31, 2022

(51) Int. Cl.
 *G06F 9/30* (2018.01)
 *G06F 9/38* (2018.01)

(52) U.S. Cl.
 CPC .......... *G06F 9/3802* (2013.01); *G06F 9/3808* (2013.01); *G06F 9/3851* (2013.01); *G06F 9/3877* (2013.01)

(58) Field of Classification Search
 CPC .... G06F 9/3802; G06F 9/3808; G06F 9/3851; G06F 9/3877
 See application file for complete search history.

(56) References Cited

U.S. PATENT DOCUMENTS

| | | | | |
|---|---|---|---|---|
| 9,933,841 B2 * | 4/2018 | Sideris | ................... | G06F 1/3243 |
| 2003/0196044 A1 * | 10/2003 | Ramirez | ............... | G06F 9/3802 |
| | | | | 712/E9.055 |
| 2015/0286484 A1 * | 10/2015 | Wiencke | ............. | G06F 9/30054 |
| | | | | 712/214 |
| 2016/0378661 A1 | 12/2016 | Gray et al. | | |
| 2019/0196836 A1 * | 6/2019 | Gschwind | ........... | G06F 12/0875 |
| 2020/0310814 A1 * | 10/2020 | Kothinti Naresh | ... | G06F 9/4881 |
| 2021/0397453 A1 * | 12/2021 | Al Sheikh | ............. | G06F 9/3808 |

OTHER PUBLICATIONS

Yang et al.; Load Redundancy Removal through Instruction Reuse; IEEE; 2000 (Year: 2000).*
Jin et al.; Macro Data Load: An Efficient Mechanism for Enhancing Loaded Data Reuse; IEEE; 2011 (Year: 2011).*
PCT/US 23/24044—Notification of Transmittal of the International Search Report and the Written Opinion of the International Searching Authority, or the Declaration dated Aug. 25, 2023.

* cited by examiner

Primary Examiner — Corey S Faherty
(74) Attorney, Agent, or Firm — MINISANDRAM LAW FIRM; Raghunath S. Minisandram

(57) ABSTRACT

A master processor is configured to execute a first thread and a second thread designated to run a program in sequence. A slave processor is configured to execute a third thread to run the program in sequence. An instruction fetch compare engine is provided. The first thread initiates a first thread instruction fetch for the program and stored in an instruction fetch storage. Retrieved data associated with the fetched first thread instruction is stored in a retrieved data storage. The second thread initiates a second thread instruction fetch for the program. The instruction fetch compare logic compares the second thread instruction fetch for the program with the first thread instruction fetch stored in the instruction fetch storage for a match. When there is a match, the retrieved data associated with the fetched first thread instruction is presented from the retrieved data storage, in response to the second thread instruction fetch.

16 Claims, 7 Drawing Sheets

SYSTEM FOR ERROR DETECTION AND CORRECTION IN A MULTI-THREAD PROCESSOR

RELATED APPLICATION

None

TECHNICAL FIELD

The present invention relates generally to a multi-thread processor and more specifically, to detect error in processing of instructions and correct error in processing of instructions.

DESCRIPTION OF RELATED ART

Microprocessors and systems based on VLSI can have a fault during operation. These faults can lead to catastrophic disaster in certain applications, for example, in automotive applications or space applications, due to malfunction. These faults can happen for various known or unknown reasons. Generally, faults can be classified as transient faults and permanent faults.

The transient fault is a temporal fault and circuit produces an unexpected value, which leads to a temporal malfunction. On the other hand, a permanent fault results when a circuit is broken and cannot be recovered. When a transient fault can be detected, the program is restarted from a known clean point, with an acceptable delay. Thereafter, the system will continue to perform at an acceptable level. On the other hand, when a permanent fault is detected, in some circumstances, the faulty section of the circuit may be avoided, if possible. Otherwise, the permanent fault may results in a total system failure.

As microprocessors are used in critical applications requiring reliable operation of the circuits, it may be beneficial to detect any potential errors in processing in a timely manner, correct any detected problems in a timely manner and restart the processing with minimal time delay. With these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, a multi-thread processor is disclosed. The multi-thread processor includes a master processor and a slave processor. The master processor is configured to execute at least a first thread and a second thread in sequence. The slave processor is configured to execute at least a third thread in sequence. An instruction fetch compare engine is provided. The first thread initiates a first thread instruction fetch for the program and the first thread instruction fetch is stored in an instruction fetch storage. Retrieved data associated with the fetched first thread instruction is stored in a retrieved data storage. The second thread initiates a second thread instruction fetch for the program. The instruction fetch compare logic compares the second thread instruction fetch for the program with the first thread instruction fetch stored in the instruction fetch storage for a match. When there is a match, the retrieved data associated with the fetched first thread instruction is presented from the retrieved data storage, in response to the second thread instruction fetch.

This brief summary is provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are described with reference to the drawings. In the drawings, the same components have the same reference numerals. The illustrated embodiments are intended to illustrate but not limit the invention. The drawings include the following figures.

DETAILED DESCRIPTION

To facilitate an understanding of the adaptive aspects of the present disclosure, an example dual core processor will be described. The specific construction and operation of the adaptive aspects of various elements of the example error detection and correction will be further described with reference to the dual core processor.

Figure 1:
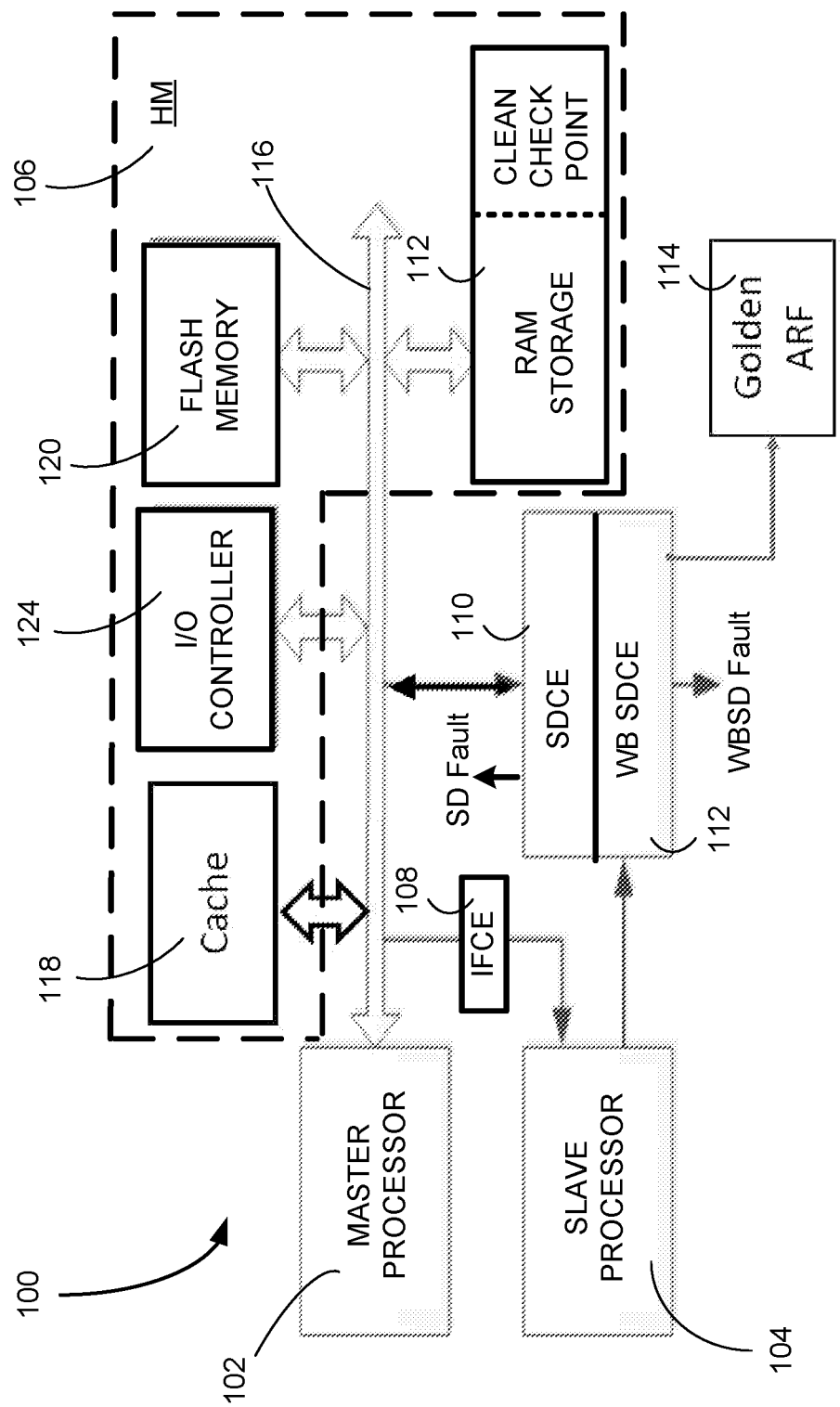
FIG. 1 shows an example system block diagram of a dual core processor, according to one aspect of the present disclosure.

FIG. 1 shows an example system 100. The system 100 includes a master processor 102 and a slave processor 104. The system 100 further includes a hierarchical memory (HM) 106, information fetch compare engine (IFCE) 108, a store data compare engine (SDCE) 110, a WB store data compare engine (WB SDCE) 112, a golden ARF 114, and a bus 116. The HM 106 includes a plurality of memory storage, for example, a cache memory 118, flash memory 120, and ram storage 122. The HM 106 further includes an I/O controller 124, which permits selective access to one or more of the plurality of memory storage or I/O devices. As one skilled in the art appreciates, data may be selectively stored and retrieved from one or more of the plurality of memory storage of the HM 106.

In one example, the master processor 102 and slave processor 104 are each configured to run a plurality of threads, for example, four threads in parallel. In one example, the master processor 102 and slave processor 104 may each run four programs in parallel. In such a scenario, there will be no redundant threads running the programs, for enhanced reliability. Further, in one example, in order to provide reliability, one or more threads in each of the master processor 102 and slave processor 104 are running the same program, results of which are compared to detect errors in execution and in some cases correct detected errors in execution. As one skilled in the art appreciates, as some threads of both the master processor 102 and the slave processor 104 are running the same program, it is beneficial to minimize access to the hierarchical memory 106. In one example, the master processor 102 has direct access to the HM 106. The slave processor 104 has indirect access to the HM 106. For example, the IFCE 108 may indirectly provide data related to an instruction fetch request for some of the threads of the master processor and slave processor. Functions and features of the IFCE 108 will be later described in detail. Similarly, SDCE 110 is configured to compare and validate store data generated by various threads for error and generate a SD fault, when an error is detected. Functions and features of the SDCE 110 will be later described in detail. Similarly, WB SDCE 112 is configured to compare and validate write back (WB) store data generated by various threads for error and generate a WBSD fault, when an error is detected. When no error is detected by the WB SDCE 112, corresponding program counter and register information is stored in the golden ARF 114, for potential future use. Golden ARF 116 is a data store used to store various address and data outputs from threads that were successfully executed. Functions and features of the WB SDCE 112 and the golden ARF 114 will be later described in detail. Now, referring to FIG. 2, further details of the system 100 will be described.

Figure 1A:
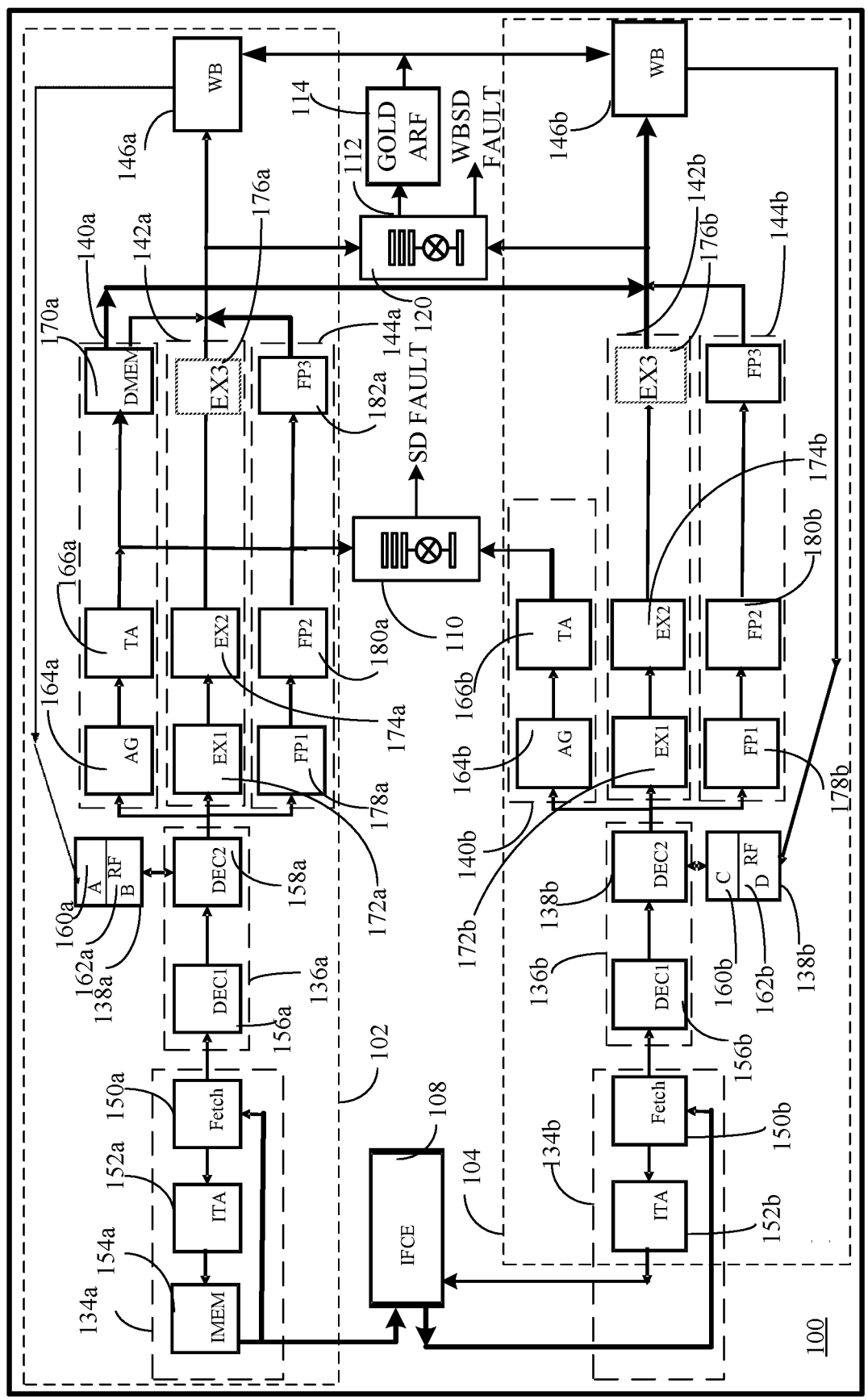
FIG. 1A shows various blocks of the system of FIG. 1, according to one aspect of the present disclosure.

FIG. 1A shows various elements of the system 100. The system 100 includes the master processor 102 and a slave processor 104. In one example, the master processor 102 and the slave processor 104 are substantially similar. Specific differences between the master processor 102 and the slave processor 104 will be described later. Each of the master processor 102 and the slave processor 104 are configured to process multiple threads, in a pipelined fashion. In one example, each of the master processor 102 and the slave processor 104 are configured to process four threads. Now details of the master processor 102 will be described. As one skilled in the art appreciates, the slave processor 104 may be substantially similar. Specific differences between the master processor 102 and the slave processor 104 will also be described later.

The master processor 102 includes a fetch block 134a, a decode block 136a, a register file block 138a (sometimes referred to as RF 138a), a load-store pipe 140a (sometimes referred to as LS pipe 140a), an ALU pipe 142a, a FP pipe 144a, and a write back block 146a (sometimes referred to as WB 146a). The slave processor 104 includes a fetch block 134b, a decode block 136b, a register file block 138b (sometimes referred to as RF 138b), a load-store pipe 140b (sometimes referred to as LS pipe 140b), an ALU pipe 142b, a FP pipe 144b, and a write back block 146b (sometimes referred to as WB 116b). As previously described, the system 100 further includes IFCE 108, SDCE 110, WB SDCE 112, and golden ARF 114.

Now, referring to master processor 102, the fetch block 134a includes a fetch instruction (Fetch) block 150a, an instruction address translator (ITA) block 152a, an instruction memory (IMEM) block 154a. The fetch instruction block 150a reads instructions in IMEM block 154a using the instruction address translator block 152a. As one skilled in the art appreciates, the IMEM block 154a is a logical block which is part of the HM 106 as previously described with reference to FIG. 1. Depending upon the address translated by the ITA block 152a, corresponding memory location to fetch the instruction may be in the cache memory 118, flash memory 120 or the ram storage 122.

The decode block 136a decodes the instructions received from the fetch block 134a. For example, the decode block 136a parses operand register sources, types of operations to be performed and destination where the results are stored. In one example, the decode block 136a includes a first decoder (DEC1) 156a and a second decoder (DEC2) 158a. The first decoder 156a decodes the received instruction and decides which one of the execution pipe, for example, load-store pipe 140a, ALU pipe 142a and FP pipe 144a will be used. The second decoder 158a obtains necessary operands for the received instruction, for example, from the register file block 138a. If the corresponding execution pipe resources are not available or operand resources are not available from the register file block 138a, the execution of the instruction has to wait until necessary resources are available.

In one example, for master processor 102, the register file block 138a may include separate register files for each thread. For example, in a two thread per processor scenario, (thread A, and thread B for master processor 102 and thread C and thread D for slave processor 104), the register file block 138a may include a thread A register file 160a and a thread B register file 162a. Similarly, the register file block 138b for slave processor 104 may include a thread C register file 160b and a thread D register file 162b.

Now, referring to the load-store pipe of master processor 102, the load-store pipe 140a includes an address generator (AG) 164a, an address translator (TA) 166a, and a data memory access (DMEM) block 170a. The address generator 164a generates the address to be used by the instruction. The generated address by the address generator 164a is a virtual address. The address translator 166a receives the virtual address from the address generator 164a and converts the virtual address to a physical address. The converted physical address is used by the data memory access block 170a to either load from the physical address or store at the physical address, as the case may be. As one skilled in the art appreciates, the DMEM block 170a is a logical block which is part of the HM 106 as previously described with reference to FIG. 1. Depending upon the address translated by the ITA block 152a, corresponding memory location to fetch the instruction may be in the cache memory 118, flash memory 120 or the ram storage 122. If the data is to be stored in a register file, for example, in the register file block 138a, the data is stored by the write back block 146a. If the data is to be stored in a memory location assigned to the master processor 102, the data memory access block 170a stores the data in the memory location of the HM 106 assigned to the master processor 102. The memory location may be either internal or external to the multi-thread processor 100.

Now, referring to the ALU pipe of master processor 102, the ALU pipe 142a includes a first execution (EX1) block 172a, a second execution (EX2) block 174a and a third execution (EX3) block 176a. Arithmetic and logical operations are selectively performed by the first execution block 172a, the second execution block 174a, and the third execution block 176a. The results are passed on to the write back block 146a, to selectively store the result in one of the register locations in the register file block 138a.

Now, referring to the FP pipe of master processor 102, the FP pipe 144a is configured to perform floating point arithmetic. Due to complexity of operation, the floating point operations take three cycles, performed in first FP (FP1) block 178a, second FP (FP2) block 180a, and third FP (FP3) block 182a. In some examples, the results of FP pipe 144a is stored in a separate FP register file (not shown). The FP register file data can be stored or loaded from memory or cache using the load-store pipe 140*a*.

In one example, the master processor 102 is a dual issue processor. This means two instructions can be issued and processed. These instructions can be a combination of a) one load-store instruction and one ALU instruction, b) one ALU instruction and one floating point instruction, and c) one load-store instruction and one floating point instruction. As both the load-store pipe and ALU pipe both use the same register file, they complete in order. So, the third execution block 176*a* in ALU pipe 142*a* aids in this process.

Having described various components of the master processor 102, in one example, the structure, function and operation of various components of the slave processor 104 is similar to various components of the master processor 102, except for the fetch block 134*b* and load-store pipe 140*b*. For example, the decode block 136*b* is similar to decode block 136*a*. The register file block 138*b* is similar to register file block 138*a*. The ALU pipe 142*b* is similar to ALU pipe 142*a*. The FP pipe 144*b* is similar to FP pipe 144*a*. The write back block 146*b* is similar to write back block 146*a*.

In one example, the fetch block 134*b* of the slave processor 104 accesses the IFCE 108, instead of an IMEM block accessed by the master processor 102. Functions and features of the IFCE 108 will be later described in detail. In one example, the load-store pipe 140*b* does not have a corresponding DMEM block as provided for the master processor 102. Instead, SDCE 110 is used to detect any potential errors in execution of threads by the slave processor 104. Functions and features of the SDCE 110 will be later described in detail.

Figure 2:
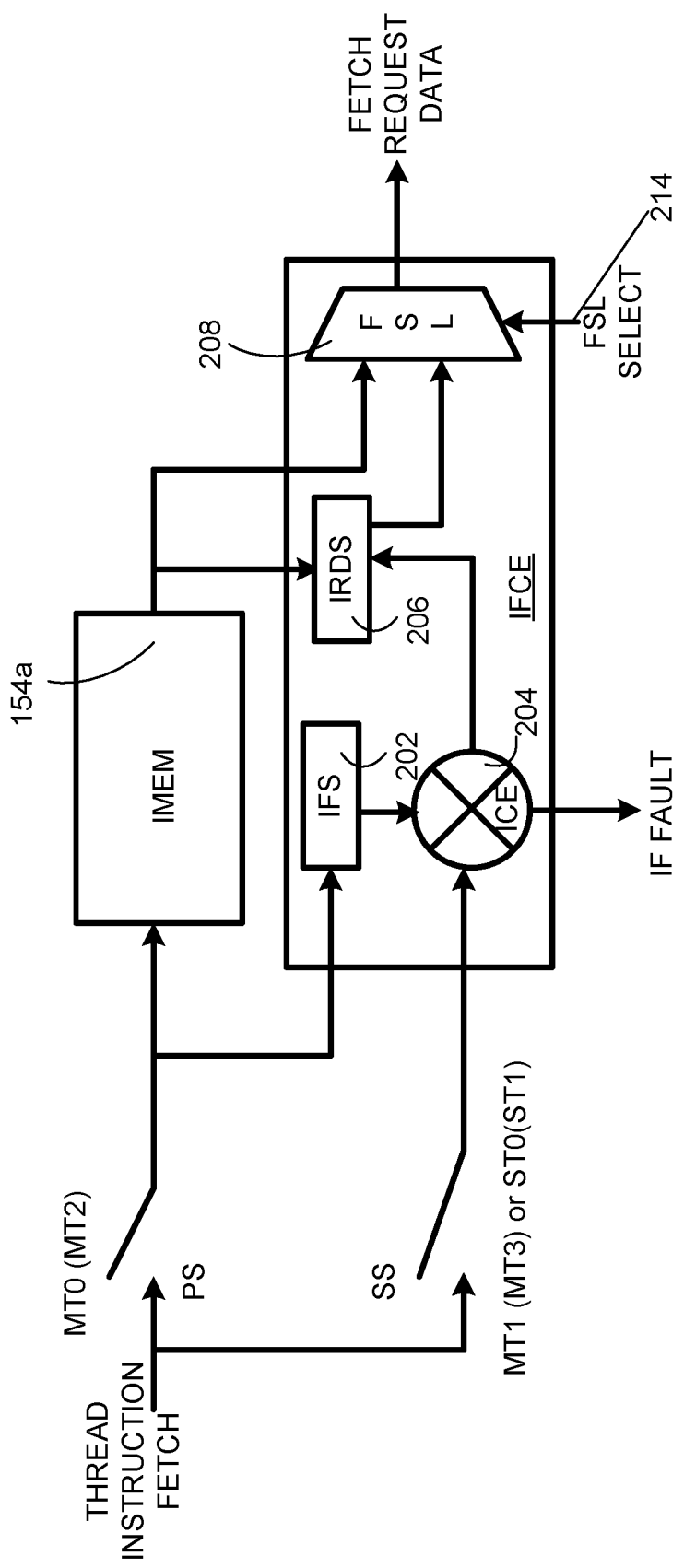
FIG. 2 shows an example instruction flow for master processor and slave processor of the system of FIG. 1A, according to one aspect of the present disclosure.

Now, referring to FIG. 2, an example IFCE 108 is described. IFCE 108 includes an instruction fetch storage (IFS) 202, instruction compare engine (ICE) 204, instruction retried data storage (IRDS) 206, and a fetch selector logic (FSL) 208. In order to explain the operation of the IFCE 108, let us consider various instruction fetch commands issued by the master processor 102 and slave processor 104, using fetch block 134*a* and 134*b* respectively.

Further, in this example, let us consider each of the master processor 102 and the slave processor 104 are executing four threads. As an example, master processor 102 is executing threads MT0, MT1, MT2, and MT3. Similarly, slave processor 104 is executing threads ST0, ST1, ST2, and ST3. As one skilled in the art appreciates, multiple threads of the system 100 may be executing same program, for redundancy, error detection, and error correction. In one example, two threads of the master processor 102 and one thread of the slave processor 104 are executing same program, in sequence. For example, the execution of the threads are staggered, for example, with a delay of one clock cycle. This configuration provides error detection, but not error correction. In another example, two threads of the master processor 102 and two threads of the slave processor 104 are executing same program, in sequence. For example, the execution of the threads are staggered, for example, with a delay of one clock cycle.

Let us consider a three thread redundant processing. For this example, let us consider threads MT0, MT1, and ST0 are all running the same program, say first program. And, threads MT2, MT3, and ST1 are all running another program, say second program. In one example, only one of the threads from the master processor 102 is permitted to directly access the IMEM 154*a*. In this example, only thread MT0 of first program and thread MT2 of second program are permitted to directly access the IMEM 154*a*. As previously described, the fetch instruction block 150*a* reads instructions in IMEM block 154*a* using the instruction address translator block 152*a*. As one skilled in the art appreciates, the IMEM block 154*a* is a logical block which is part of the HM 106 as previously described with reference to FIG. 1. Depending upon the address translated by the ITA block 152*a*, corresponding memory location to fetch the instruction may be in the cache memory 118, flash memory 120 or the ram storage 122.

When first thread MT0 instruction fetch is issued, the primary switch (PS) 210 is selectively closed and the first thread MT0 instruction fetch instruction is permitted to access IMEM 154*a*. In addition, the first thread MT0 instruction fetch instruction is stored in the IFS 202 of the IFCE 108. Thereafter, the first thread MT0 instruction fetch instruction retrieves corresponding data from the IMEM 154*a*. The retried data corresponding to the first thread MT0 instruction fetch is stored in the IRDS 206 and also fed to the FSL 208.

FSL 208 in one example is a two input, one output multiplexer, with first input coupled to the output of IMEM 154*a* and second input coupled to the IRDS 206. The FSL select 214 signal selectively outputs either the first input or the second input, based on the thread executing the fetch request. In one example, the FSL 208 outputs first input if the thread executing the fetch request is MT0. And, the FSL 208 outputs second input if the thread executing the fetch request is MT1 or ST0. Now, as thread MT0 is executing the fetch instruction, the first input is passed on to the output of the FSL 208 for further processing. Thereafter, the thread MT0 continues through various stages of the pipelines of master processor 102, as previously described with reference to FIG. 1A.

When second thread MT1 instruction fetch is issued, the primary switch (PS) 210 is open and secondary switch (SS) 212 is selectively closed and selectively fed to the ICE 204. The ICE 204 compares the second thread MT1 instruction fetch instruction with stored first MT0 instruction fetch instruction in the IFS 202 for a match. When there is a match, the ICE 204 sends a match signal to the IRDS 206. Based on the receipt of the match signal, IRDS 206 outputs the stored data corresponding to the first thread MT0 instruction fetch previously stored in the IRDS 206 as second input to the FSL 208. As the thread executing the fetch request is thread MT1, the FSL select signal 214 is set to enable the second input to be output at the FSL 208. Thereafter, the thread MT1 continues through various stages of the pipelines of master processor 102, as previously described with reference to FIG. 1A.

When third thread ST0 instruction fetch is issued by the slave processor 104, the primary switch (PS) 210 is open and secondary switch (SS) 212 is selectively closed and selectively fed to the ICE 204. The ICE 204 compares the third thread ST0 instruction fetch instruction with stored first MT0 instruction fetch instruction in the IFS 202 for a match. When there is a match, the ICE 204 sends a match signal to the IRDS 206. Based on the receipt of the match signal, IRDS 206 outputs the stored data corresponding to the first thread MT0 instruction fetch previously stored in the IRDS 206 as second input to the FSL 208. As the thread executing the fetch request is thread ST0, the FSL select signal 214 is set to enable the second input to be output at the FSL 208. Thereafter, the thread ST0 continues through various stages of the pipelines of master processor 102, as previously described with reference to FIG. 1A.

When the ICE 204 determines that there is no match, an IF Fault signal 216 is triggered. As we are running only three threads for redundancy, we can conclude that there was an error, but we cannot correct the error. At this time, an interrupt service routine is initiated to rerun the first program from a known good point.

As this is a read operation related fault (instruction fetch), it is preferable to restart from a known good point, as a fault likely happened in some fetch related logic block. In some examples, it may be a transient error. In some examples, it may be a permanent error, if the error repeats itself. In most examples, the memory is protected by ECC or parity, so any errors related to memory are either detected or corrected.

Figure 3:
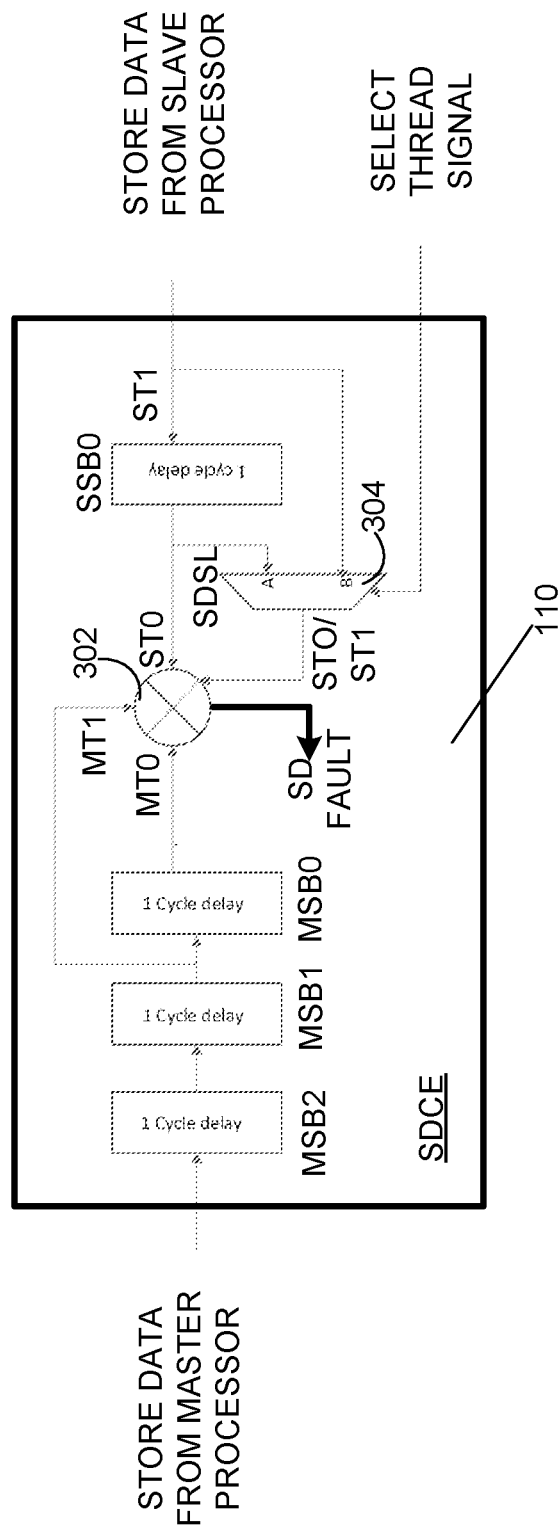
FIG. 3 shows an example store data compare engine, according to one aspect of the present disclosure.

Having described the functions and features of the IFCE 108, now referring to FIG. 3, example operation of the SDCE 110 will now be described. FIG. 3 shows SDCE 110. SDCE 110 includes a store compare engine (SCE) 302, a plurality of master store buffers MSB0, MSB1, and MSB2, and a slave store buffer SSB0. The SDCE 110 further includes a store data selector logic (SDSL) 304. The plurality of master store buffers MSB0, MSB1, and MSB2 receive output of the address translator 166a of master processor 102 in sequence and are shifted into the master store buffers, in three clock cycles. In other words, the store data from thread MT0 will be available at the output of the master store buffer MSB0 (after three clock cycle delay), and store data from thread MT1 will be available at the output of the master store buffer MSB1 (after two clock cycle delay). Similarly, the slave store buffer SSB0 receives output of the address translator 166b of slave processor 104 in sequence. So, after one clock cycle, the output of the slave store buffer SSB0 will have store data from thread ST0. At the same time, the input of the slave store buffer SSB0 will have store data from thread ST1.

The store compare engine 302 is configured to receive up to four inputs and compare the received inputs for match. If there is no match, the store compare engine 302 generates a store data fault signal (SD fault). SD fault initiates a SD interrupt routine. If the system is running three redundant threads (MT0, MT1, and ST0), then, store compare engine 302 will compare store data from the three threads MT0, MT1, and ST0 for a match. If there is no match, then SD fault is generated. On the other hand, if the system is running four redundant threads (MT0, MT1, ST0, and ST1), then, store compare engine 302 will compare store data from the four threads MT0, MT1, ST0, and ST1.

The SDSL 304 is configured to receive two inputs and selectively output one of the inputs based on a select thread signal (ST signal). One of the inputs to the SDSL 304 is the input to the slave buffer SB0 and another input to the SDSL 304 is the output of the slave buffer SB0. The output of the SDSL 304 is fed to the SCE 302 for comparison. As previously described, the output of the slave buffer SB0 corresponds to the store data of thread ST0 and the input of the slave buffer SB0 corresponds to the store data of thread ST1 (if four thread mode is run for redundancy). So, if the system is running three threads in redundant mode, the ST signal will enable the output of the slave buffer SB0 to be presented at the output of the SDSL 304. In this example, it will be the store data of thread ST0 of slave processor. The SCE 302 is now comparing only store data from MT0, MT1, ST0, and ST0 (in effect, store data from three threads). On the other hand, if the system is running four threads in redundant mode, the ST signal will enable the input of the slave buffer SB0 to be presented at the output of the SDSL 304. In this example, it will be the store data of thread ST1 of slave processor. The SCE 302 is now comparing store data from MT0, MT1, ST0, and ST1. As previously described, if there is no match, SD fault signal is raised and SD interrupt routine is initiated.

In one example, the store data from thread MT0 is also fed to the DMEM 170a for storage. As one skilled in the art appreciates, the DMEM block 170a is a logical block which is part of the HM 106 as previously described with reference to FIG. 1. Depending upon the address translated by the ITA block 152a, corresponding memory location to store the store data may be in the cache memory 118, flash memory 120 or the ram storage 122. When there is a match in the SDCE 110, there is no need to perform store data operation from redundant threads MT1, ST0 (for three thread mode) or redundant threads MT1, ST0, and ST1 (for four thread mode).

In a three thread mode, if there is no match and SD fault initiates the SD interrupt routine, the SD interrupt routine will re-execute the instruction that resulted in the store data operation, for all the three threads. If there is a match in the SDCE 110, during re-execution, then, the previous error is considered a transient error and the system continues to process subsequent instructions. If after one or more re-execution, based on a threshold value, the SD interrupt may determine that the error may be a permanent error, and raise another interrupt to initiate a permanent error interrupt routine.

In a four thread mode, if the store data from majority of the threads match, and store data from thread MT0 is part of the match, then, the error is considered a transient error and no further action is taken. As previously discussed, the thread MT0 has already stored the store data in the HM 106 and there is no need to re-write the store data. If on the other hand, if the store data from thread MT0 is not a match with two other store data (say store data from two of the threads of thread MT1, ST0, and ST1), then, the SD interrupt service routine will re-execute the store data instruction, as the store data in the memory location of the HM 106 is suspect.

Figure 4:
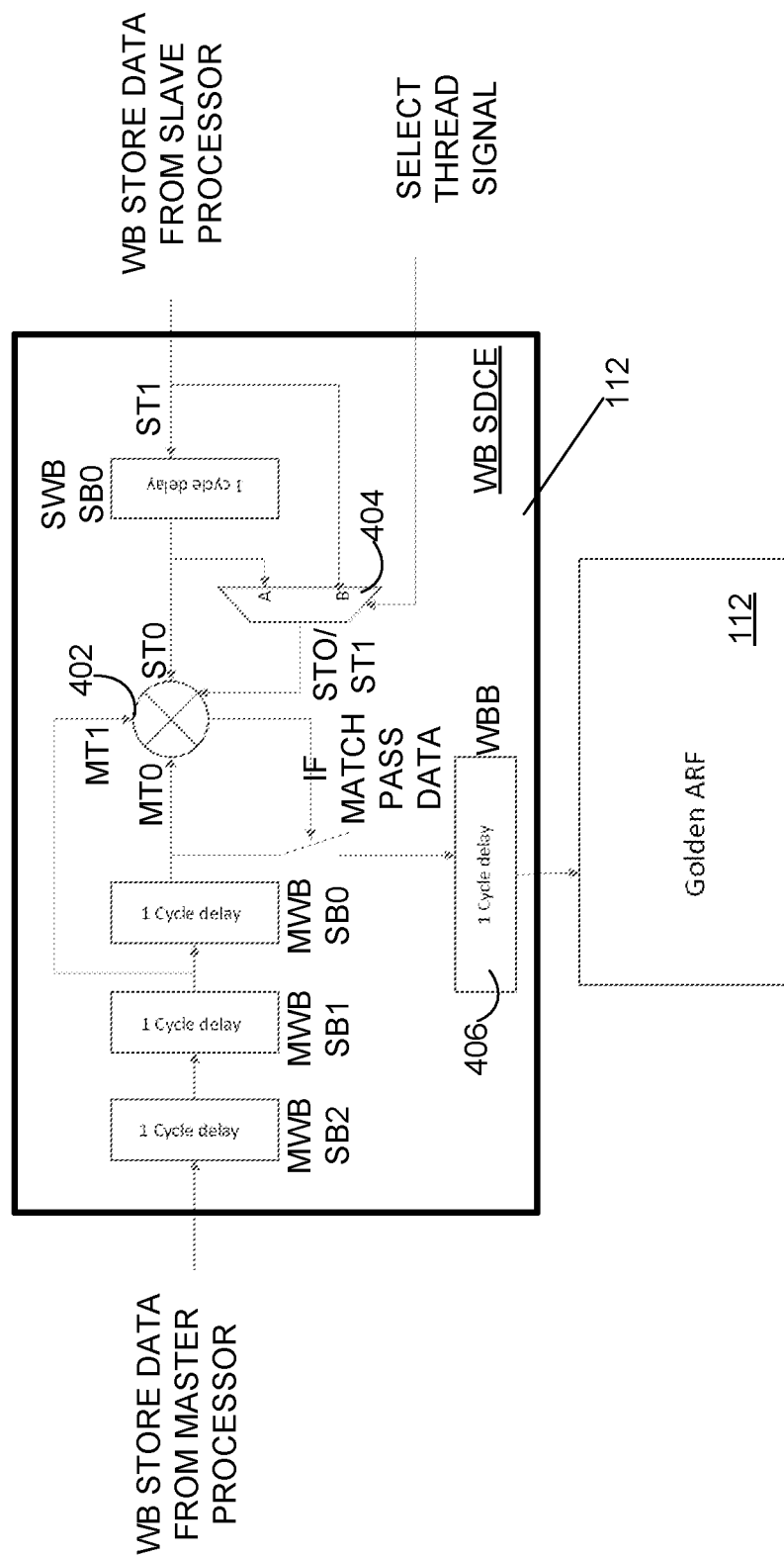
FIG. 4 shows an example write back store compare engine, according to one aspect of the present disclosure.

Having described the functions and features of the SDCE 110, now referring to FIG. 4, example operation of the WB SDCE 112 will now be described. WB SDCE 112 construction is similar to the construction of the SDCE 110, with additional features to store WB store data in the golden ARF 114, when there is a match. FIG. 4 shows WB SDCE 112. WB SDCE 112 includes a WB store compare engine (WB SCE) 402, a plurality of master store buffers MWBSB0, MWBSB1, and MWBSB2, and a slave store buffer SWBSB0. The WB SDCE 112 further includes a WB store data selector logic (WBSD SL) 404. The plurality of master store buffers MWBSB0, MWBSB1, and MWBSB2 receive input to the WB 146a of master processor 102 in sequence and are shifted into the master store buffers, in three clock cycles. In other words, the store data from thread MT0 will be available at the output of the master store buffer MWBSB0 (after three clock cycle delay), and store data from thread MT1 will be available at the output of the master store buffer MWBSB1 (after two clock cycle delay). Similarly, the slave store buffer SWBSB0 receives input to the WB 146b of slave processor 104 in sequence. So, after one clock cycle, the output of the slave store buffer SWBSB0 will have store data from thread ST0. At the same time, the input of the slave store buffer SWBSB0 will have store data from thread ST1.

The WB SCE 402 is configured to receive up to four inputs and compare the received inputs for match. If there is no match, the WB store compare engine 402 generates a WB store data fault signal (WBSD fault). WBSD fault initiates a WBSD interrupt routine. If the system is running three redundant threads (MT0, MT1, and ST0), then, WB SCE 402 will compare store data from the three threads MT0, MT1, and ST0 for a match. If there is no match, then WBSD fault is generated. On the other hand, if the system is running four redundant threads (MT0, MT1, ST0, and ST1), then, WB SCE 402 will compare store data from the four threads MT0, MT1, ST0, and ST1.

The WB SDSL 404 is configured to receive two inputs and selectively output one of the inputs based on a WB select thread signal (WBST signal). One of the inputs to the WB SDSL 404 is the input to the WB slave buffer SWBSB0 and another input to the WB SDSL 404 is the output of the slave buffer WBSSB0. The output of the WB SDSL 404 is fed to the WB SCE 402 for comparison. As previously described, the output of the slave buffer WBSSB0 corresponds to the WB store data of thread ST0 and the input of the slave buffer WBSSB0 corresponds to the WB store data of thread ST1 (if four thread mode is run for redundancy). So, if the system is running three threads in redundant mode, the WBST signal will enable the output of the slave buffer WBSSB0 to be presented at the output of the WB SDSL 404. In this example, it will be the WB store data of thread ST0 of slave processor. The WB SCE 402 is now comparing only store data from MT0, MT1, ST0, and ST0 (in effect, WB store data from three threads). On the other hand, if the system is running four threads in redundant mode, the WBST signal will enable the input of the slave buffer WBSSB0 to be presented at the output of the WB SDSL 404. In this example, it will be the store data of thread ST1 of slave processor. The WB SCE 402 is now comparing store data from MT0, MT1, ST0, and ST1. As previously described, if there is no match, WSD fault signal is raised and SD interrupt routine is initiated.

In one example, the WB store data from threads MT0, MT1, ST0 (for three thread mode) is simultaneously processed by WB 146a and WB 146b and stored in the thread specific register files of the register file block (as previously described), independent of the result of the WB SDCE 112. When there is a match in the WB SDCE 112, there is no need to update corresponding register files of the register file block. Also, when there is a match, the WB store data is buffered for one clock cycle, by the WB buffer (WBB) 406 and thereafter, written into the golden ARF 114. As previously described, the golden ARF 114 stores corresponding program counter of the instruction being executed and associated data. This record indicates last successful instruction execution and corresponding ARF data for subsequent recovery operation initiated by an interrupt service routine, upon detection of a fault in the execution of the instructions by the system. Since each thread is running at different run time, each thread may have different ARF values at the time of interrupt. As part of executing an interrupt service routine, each thread ARF will be updated using golden ARF value and the program will restart where the fault was detected.

In a three thread mode, if there is no match and WBSD fault initiates the WBSD interrupt routine, the WBSD interrupt routine will re-execute the instruction that resulted in the WB store data operation, for all the three threads. If there is a match in the WB SDCE 112, during re-execution, then, the previous error is considered a transient error and the system updates corresponding register files for all three threads. Thereafter, the system continues to process subsequent instructions. If after one or more re-execution, based on a threshold value, the WBSD interrupt may determine that the error may be a permanent error, and raise another interrupt to initiate a permanent error interrupt routine.

In a four thread mode, if the WB store data from majority of the threads match, then, the error is considered a transient error and the register file corresponding to the thread whose WB store data did not match is updated with the matched WB store data. On the other hand, if the WB store data from two or more threads is not a match, then, the WBSD interrupt service routine will re-execute the WB store data instruction for all the threads, as the WB store data in the corresponding register files are suspect.

Figure 5A:
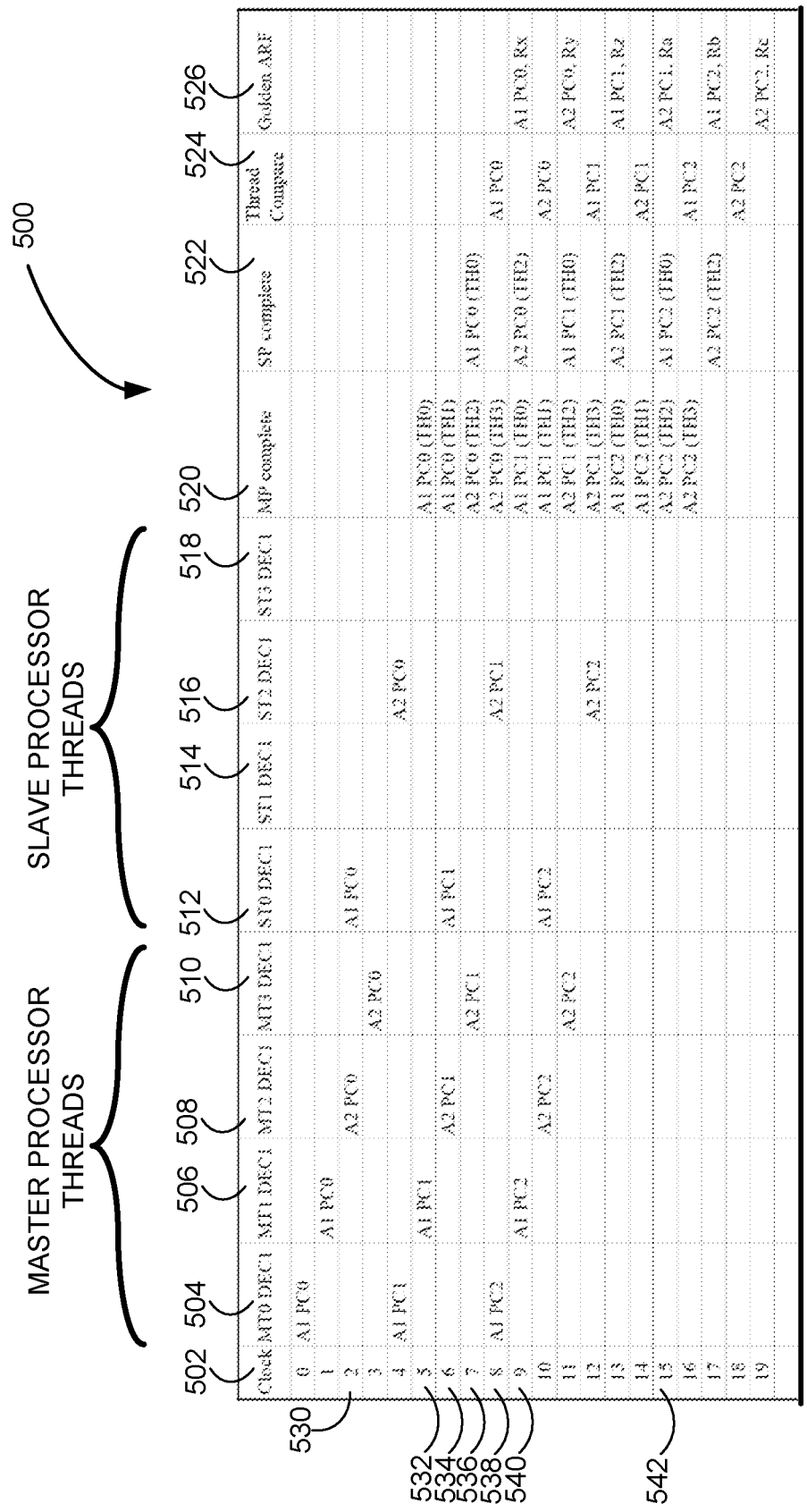
FIG. 5A shows an example table showing execution of various threads in the master processor and slave processor in a three thread redundant mode, according to one aspect of the present disclosure.

Now, referring to FIGS. 5A and 5B, example three thread processing and four thread processing will be described. Now, referring to FIG. 5A, an example table 500 is shown, with progress of various threads. For example, column 502 shows various clock cycles. Various threads of master processor in decode 1 (DEC1) stage is shown in columns 504-510. Column 504 shows master processor thread 0 (MT0) in decode 1 stage (DEC1), column 506 shows master processor thread 1 (MT1) in DEC1 stage, column 508 shows master processor thread 2 (MT2) in DEC1 stage, column 510 shows master processor thread 3 (MT3) in DEC1 stage. Various threads of slave processor in decode 1 (DEC1) stage is shown in columns 512-518. Column 512 shows slave processor thread 0 (ST0) in decode 1 stage (DEC1), column 514 shows slave processor thread 1 (ST1) in DEC1 stage, column 516 shows slave processor thread 2 (ST2) in DEC1 stage, column 518 shows slave processor thread 3 (ST3) in DEC1 stage. Column 520 shows when each of the threads of master processor complete the processing. Column 522 shows when each of the threads of slave processor complete the processing. Column 524 shows when thread compare is performed. Column 526 shows when the data is stored in the golden ARF.

In this example, master processor threads MT0, MT1, and ST0 are running program A1 in redundant mode (three thread mode). And, master processor threads MT1, MT2, and ST1 are running program A2 in redundant mode (three thread mode). As previously described, the system in operating in order issue and in order completion mode. So, MT0, MT1, and ST0 are run in sequence, in consecutive clock cycles and complete in consecutive clock cycles. For example, program A1 PC0 is run in sequence by threads MT0, MT1, and ST0. And, MT2, MT3, and ST1 are run in sequence, in consecutive clock cycles and complete in consecutive clock cycles. For example, program A2 PC0 is run in sequence by thread MT2, MT3, and ST1. As an example, referring to row 530, at clock cycle 2, the thread MT2 is running program A2, PC0 in DEC1. And, the thread ST0 is running program A1, PC0 in DEC1.

Now, referring to row 532 and column 520, at clock 5, we notice that thread MT0 for program A1 PC0 is complete in master processor. Similarly, referring to row 534 and column 520, at clock 6, we notice that thread MT1 for program A1 PC0 is complete in master processor. Similarly, referring to row 536 and column 522, at clock 7, we notice that thread ST0 for program A1 PC0 is complete in slave processor. Thereafter, thread compare (for example, WB store data compare) happens in clock 8, for example, in the WB SDCE 112, as previously described with reference to FIG. 4. If there is a match, corresponding program counter (PC) and associated architectural register files are stored in the golden ARF (column 526) in clock 9, for example, as shown in row 540. In the example, the program is A1, PC is PC0, and architectural register files are Rx.

Table 500 shows various progression of program A1 and program A2 through the system, in three thread mode, and corresponding golden ARF value, if there was a match in the WB SDCE 112. Let us consider row 542, wherein the program A2, PC1 has successfully completed and there was a match, with data for program A2, PC1 and corresponding golden ARF register files of Ra (as shown in column 526). If on the other hand, if there was no match, WB interrupt service routine (WB ISR) will be initiated. In one example, the WB ISR routine will switch the execution of program A2 in a four thread mode. However, the program A1 will continue in a three thread mode. Now, referring to FIG. 5B, another table 550 is shown, showing the execution of program A1 in three thread mode and execution of program A2 in four thread mode.

Figure 5B:
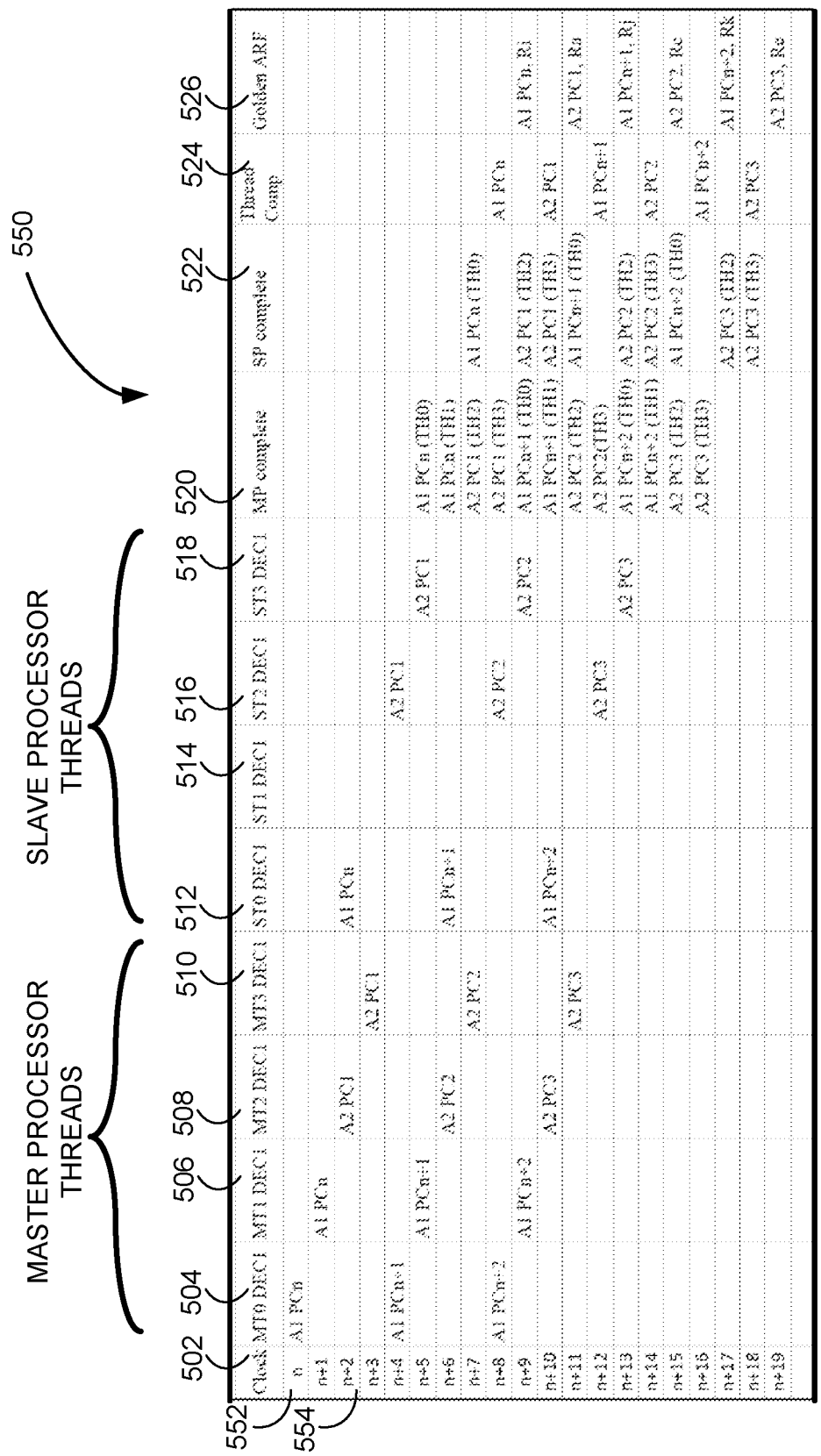
FIG. 5B shows an example table showing execution of various threads in the master processor and slave processor in a three thread and four thread redundata mode, according to one aspect of the present disclosure.

Now, referring to FIG. 5B, table 550 is shown. Column description of the table 550 is same as column description of the table 500. In this example, at clock n, the WB ISR has initiated a four thread mode for program A2. However, program A1 is continuing to run in three thread mode. For example, referring to row 552 and column 502, we notice that the program A1 is executing PCn in master processor thread MT0, in DEC1. As previously mentioned, program A2 at PC1 generated a fault. So, referring to row 554 and column 510, we notice that at clock cycle n+2, master processor thread MT2 is re-executing program A2, PC1 in DEC1 stage. Similarly, program A2, PC1 in DEC1 stage is executed by master processor thread MT3 in clock cycle n+3. Similarly, program A2 PC1 in DEC1 stage is executed by slave process threads ST2 and ST3 in clock cycles n+4, and n+5 respectively. Eventually, all the four threads MT2, MT3, ST2, and ST3 complete the processing in sequence, in clock cycles n+7, n+8, n+9, and n+10 respectively. If the WB store data is same in all the threads, then, in clock cycle n+11, the corresponding PC value (here A2 PC1) and corresponding architectural register files (Ra) are stored in the golden ARF, as shown in column 526. In one example, if three of the thread WB store data matches, fourth data may be corrected using data corresponding to the majority match. In one example, program A2 may continue to run in a four thread mode, for few more cycles and at some point, may switch back to three thread mode. As one skilled in the art appreciates, program A1 is continuing to run in three thread mode.

As one skilled in the art appreciates, by selectively running programs in three thread mode and thereafter, switching to a four thread mode when a fault is detected advantageously reduces the power consumption in the system. Moreover, running a three thread mode also increases the speed of execution of the program. In some examples, depending upon the level of reliability required, the system can switch between a three thread mode and a four thread mode. In some examples, when running a three thread mode, results of both the threads in the master processor may match, but there can be a mismatch between the results of the threads in the master processor and the result of the slave thread processor. In such a scenario, it could be a temporal fault that occurred in the slave processor or a permanent fault in the master processor. In order to further understand the fault, in such a scenario, it may be beneficial to run the program in four thread mode, to isolate between a temporal fault in the slave processor and a permanent fault in the master processor.

As one skilled in the art appreciates, the interrupt service routine associated with instruction fetch fault, store data fault and WB store data fault are unique to each other and are executed separately. However, if the fault persists, the system will restart using the clean check point stored in the RAM storage 112.

In some examples, the system 100 may be referred to as a dual core lock step processor. In some examples, the system 100 may be referred to as a multi-thread, in-order issue, in-order completion processor. In-order issue means that instructions are sent to execution pipe as per program sequence. In-order completion means that instructions are completed as per program sequence.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A multi-thread processor, including:
   a master processor configured to execute at least a plurality of threads, with at least a first thread and a second thread designated to run a program in sequence;
   a slave processor configured to execute at least a third thread, with the third thread designated to run the program in sequence; and
   an instruction fetch compare engine;
   wherein, the first thread of the master processor configured to
      initiate a first thread instruction fetch for the program, the first thread instruction fetch for the program stored in an instruction fetch storage;
      retrieve data associated with the fetched first thread instruction; and
      store the retrieved data associated with the fetched first thread instruction in a retrieved data storage;
   wherein, the second thread of the master processor configured to
      initiate a second thread instruction fetch for the program; and
   wherein, the instruction fetch compare logic compares the second thread instruction fetch for the program with the first thread instruction fetch stored in the instruction fetch storage for a match; and
      when there is a match, present the retrieved data associated with the fetched first thread instruction from the retrieved data storage, in response to the second thread instruction fetch for the program.

2. The multi-thread processor of claim 1, wherein, the instruction fetch compare engine concludes an error was detected, when there is no match between the second thread instruction fetch for the program with the first thread instruction fetch stored in the instruction fetch storage.

3. The multi-thread processor of claim 1, wherein, the third thread of the slave processor configured to
   initiate a third thread instruction fetch for the program; and
   wherein, the instruction fetch compare logic compares the third thread instruction fetch for the program with the first thread instruction fetch stored in the instruction fetch storage for a match; and when there is a match, present the retrieved data associated with the fetched first thread instruction from the retrieved data storage, in response to the third thread instruction fetch for the program.

4. The multi-thread processor of claim 3, further including a fetch selector logic, the fetch selector logic including a first input, a second input, and an output, with a selector signal selectively configured to present either the first input or the second input at the output;
- the first thread of the master processor retrieves data associated with the fetched first thread instruction from an instruction memory and presents to the first input of the fetch selector logic;
- an output of the retrieved data storage presented to the second input of the fetch selector logic; and
- the selector signal selectively presents the first input to the output when the first thread is active and selectively presents the second input to the output when the second thread or the third thread is active.

5. The multi-thread processor of claim 3, further including at least one store data compare engine, the at least one store data compare engine compares store data outputs generated by execution of a store instruction by the first thread, the second thread, and the third thread for a match; and
- generates a store data fault signal when there is no match between the outputs of at least two of the outputs generated by the execution of the store instruction.

6. The multi-thread processor of claim 5, wherein, the store data fault signal initiates an interrupt service routine to re-execute the store data instruction that generated the store data output.

7. The multi-thread processor of claim 3, further including at least one WB store data compare engine, the at least one WB store data compare engine compares WB store data outputs generated by execution of a WB store instruction by the first thread, the second thread, and the third thread for a match;
- when there is a match, stores the WB store data outputs and corresponding program counter values in a golden ARF storage; and
- completes storage of the WB store data outputs in corresponding storage locations.

8. The multi-thread processor of claim 7, wherein, the WB store data compare engine generates a WB store data fault signal when there is no match between the outputs generated by at least two of the outputs generated by the execution of the WB store instruction.

9. The multi-thread processor of claim 8, wherein, the WB store data fault signal initiates another interrupt service routine to restore data from the golden ARF storage, from a known good point and re-execute the program from the known good point.

10. The multi-thread processor of claim 1, wherein, the slave processor is configured to execute a fourth thread, the fourth thread of the slave processor configured to
- initiate a fourth thread instruction fetch for the program; and
- wherein, the instruction fetch compare logic compares the fourth thread instruction fetch for the program with the first thread instruction fetch stored in the instruction fetch storage for a match; and
- when there is a match, present the retrieved data associated with the fetched first thread instruction from the retrieved data storage, in response to the fourth thread instruction fetch for the program.

11. The multi-thread processor of claim 10, further including at least one store data compare engine, the at least one store data compare engine compares store data outputs generated by execution of a store instruction by the first thread, the second thread, the third thread, and the fourth thread for a match; and
- generates a store data fault signal unless there is a match between the outputs of at least three of the outputs generated by the execution of the store instruction.

12. The multi-thread processor of claim 11, wherein, the store data fault signal initiates an interrupt service routine to re-execute the store data instruction that generated the store data output.

13. The multi-thread processor of claim 11, wherein, when there is a match between the outputs of at least three of the outputs generated by the execution of the store instruction, and the output of the first thread does not match with the output of the other three outputs, the store instruction is re-executed.

14. The multi-thread processor of claim 10, further including at least one WB store data compare engine, the at least one WB store data compare engine compares WB store data outputs generated by execution of a WB store instruction by the first thread, the second thread, the third thread, and the fourth thread for a match;
- when there is a match, stores the WB store data outputs and corresponding program counter values in a golden ARF storage; and
- completes storage of the WB store data outputs in corresponding storage locations.

15. The multi-thread processor of claim 14, wherein, the WB store data compare engine generates a WB store data fault signal when there is no match between the outputs generated by all of the outputs generated by the execution of the WB store instruction.

16. The multi-thread processor of claim 15, wherein, the WB store data fault signal initiates another interrupt service routine to restore data from the golden ARF storage, from a known good point and re-execute the program from the known good point.

* * * * *